(12) United States Patent
Elango et al.

(10) Patent No.: US 10,687,180 B2
(45) Date of Patent: Jun. 16, 2020

(54) SYSTEM AND METHOD FOR DYNAMICALLY MANAGING COMMUNICATION GROUPS

(71) Applicant: INZANE LABS PRIVATE LIMITED, Mumbai (IN)

(72) Inventors: Allwin Agnel Elango, Mumbai (IN); Sandeep Kalidindi, Mumbai (IN)

(73) Assignee: INZANE LABS PRIVATE LIMITED, Mumbai (IN)

( * ) Notice: Subject to any disclaimer, the term of this patent is extended or adjusted under 35 U.S.C. 154(b) by 0 days.

(21) Appl. No.: 16/313,439

(22) PCT Filed: Jun. 27, 2017

(86) PCT No.: PCT/IB2017/053830
§ 371 (c)(1),
(2) Date: Dec. 26, 2018

(87) PCT Pub. No.: WO2018/002821
PCT Pub. Date: Jan. 4, 2018

(65) Prior Publication Data
US 2019/0166468 A1    May 30, 2019

(30) Foreign Application Priority Data
Jun. 27, 2016 (IN) .............................. 201621021966

(51) Int. Cl.
*H04W 4/08* (2009.01)
*H04L 29/08* (2006.01)
*H04W 4/21* (2018.01)
*G06Q 10/10* (2012.01)
*G06Q 50/00* (2012.01)

(52) U.S. Cl.
CPC .............. *H04W 4/08* (2013.01); *G06Q 10/10* (2013.01); *G06Q 50/01* (2013.01); *H04L 29/08* (2013.01); *H04L 67/306* (2013.01); *H04W 4/21* (2018.02)

(58) Field of Classification Search
CPC ........ H04W 4/08; H04W 4/21; H04L 67/306; H04L 29/08; G06Q 50/01; G06Q 10/10
See application file for complete search history.

(56) References Cited

U.S. PATENT DOCUMENTS

| | | | |
|---|---|---|---|
| 6,480,885 B1 * | 11/2002 | Olivier | H04L 12/1859 709/202 |
| 8,271,631 B1 | 9/2012 | Horvitz et al. | |
| 2012/0089678 A1 * | 4/2012 | Cort | G06Q 50/01 709/204 |

(Continued)

*Primary Examiner* — Ankur Jain
(74) *Attorney, Agent, or Firm* — Maschoff Brennan

(57) ABSTRACT

The present disclosure relates to a method and system for dynamically managing one or more communication groups. In some embodiments of the present disclosure, the method comprises the steps of, determining one or more parameters associated with a user profile of a user subscribed to the dedicated networking platform, determining one or more pre-defined objectives associated with the one or more communication groups, evaluating the user to determine relevance with the one or more pre-defined objectives associated with the one or more communication groups, wherein evaluating comprises generating a relevancy score and recommending the one or more communication groups to the user based on the relevancy score.

6 Claims, 3 Drawing Sheets

(56) References Cited

U.S. PATENT DOCUMENTS

| | | | | |
|---|---|---|---|---|
| 2013/0311222 A1* | 11/2013 | Chaturvedi | ...... | G06Q 10/06398 705/7.15 |
| 2014/0188990 A1* | 7/2014 | Fulks | ................... | H04L 65/403 709/204 |
| 2014/0258503 A1* | 9/2014 | Tong | ................... | H04L 12/1827 709/224 |
| 2016/0173436 A1* | 6/2016 | Koolwal | ................. | H04L 51/32 709/206 |
| 2017/0046660 A1* | 2/2017 | Jaiswal | .............. | G06Q 10/1093 |

* cited by examiner

SYSTEM AND METHOD FOR DYNAMICALLY MANAGING COMMUNICATION GROUPS

FIELD OF INVENTION

The present invention relates generally to dynamically managing the communication groups and more particularly to recommending the communication groups to one or more users.

BACKGROUND

Groups and forums on social networking platforms or otherwise are created to serve as a common platform for people with similar interests, objectives and the like, and therefore it is but natural for such groups to have members (i.e. users) in large numbers. However, several platforms created for professional networking, knowledge sharing and more particularly to create learning environment have groups with well-defined objectives and the members of the group are expected to follow the same.

The traditional systems for managing the communication groups use moderators in between the user and the system. For example, as disclosed in granted U.S. Pat. No. 8,271,631B1, a communication group manager is required for scheduling and managing the communication groups.

Further, the user data validation for joining a communication group requires manual screening of each user. The most of the groups available are open to everyone, thus compromising the quality of the group, without proper user data validation.

Furthermore, large numbers of groups are recommended by the systems to the user to join without being aware of user's area of interest or users' profile information. Specifically, To overcome the above mentioned problems, there exist a need for recommending and dynamically managing the communication groups for one or more users.

SUMMARY

This summary is provided to introduce aspects related to methods and systems for dynamically managing and recommending the communication groups for at least one user and the various aspects are further described below in the detailed description. This summary is neither intended to identify essential features of the claimed subject matter nor is it intended for use in determining or limiting the scope of the claimed subject matter.

The present disclosure relates to a method and system for dynamically managing one or more communication groups. In some embodiments of the present disclosure, the method comprises the steps of, determining one or more parameters associated with a user profile of a user subscribed to the dedicated networking platform, determining one or more pre-defined objectives associated with the one or more communication groups, evaluating the user to determine relevance with the one or more pre-defined objectives associated with the one or more communication groups, wherein evaluating comprises generating a relevancy score and recommending the one or more communication groups to the user based on the relevancy score. In another embodiment of the present disclosure, the method further comprises the step of automatically removing the from the one or more communication groups upon identifying failure to meet a pre-determined threshold defined for the selected one or more communication groups for a pre-determined period of time.

BRIEF DESCRIPTION OF DRAWINGS

The invention will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those skilled in the art having the benefit of the description herein.

DETAILED DESCRIPTION

For the purpose of promoting an understanding of the principles of the invention, reference will now be made to the embodiment illustrated in the figures and specific language will be used to describe them. It will nevertheless be understood that no limitation of the scope of the invention is thereby intended. Such alterations and further modifications in the illustrated system, and such further applications of the principles of the invention as would normally occur to those skilled in the art are to be construed as being within the scope of the present invention.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may all, but not necessarily do, refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the meaning as commonly understood by one of ordinary skill in the art to which this invention belongs. The systems, methods, and examples provided herein are only illustrative and not intended to be limiting.

Embodiments of the present invention will be described below in detail with reference to the accompanying figures.

Figure 1:
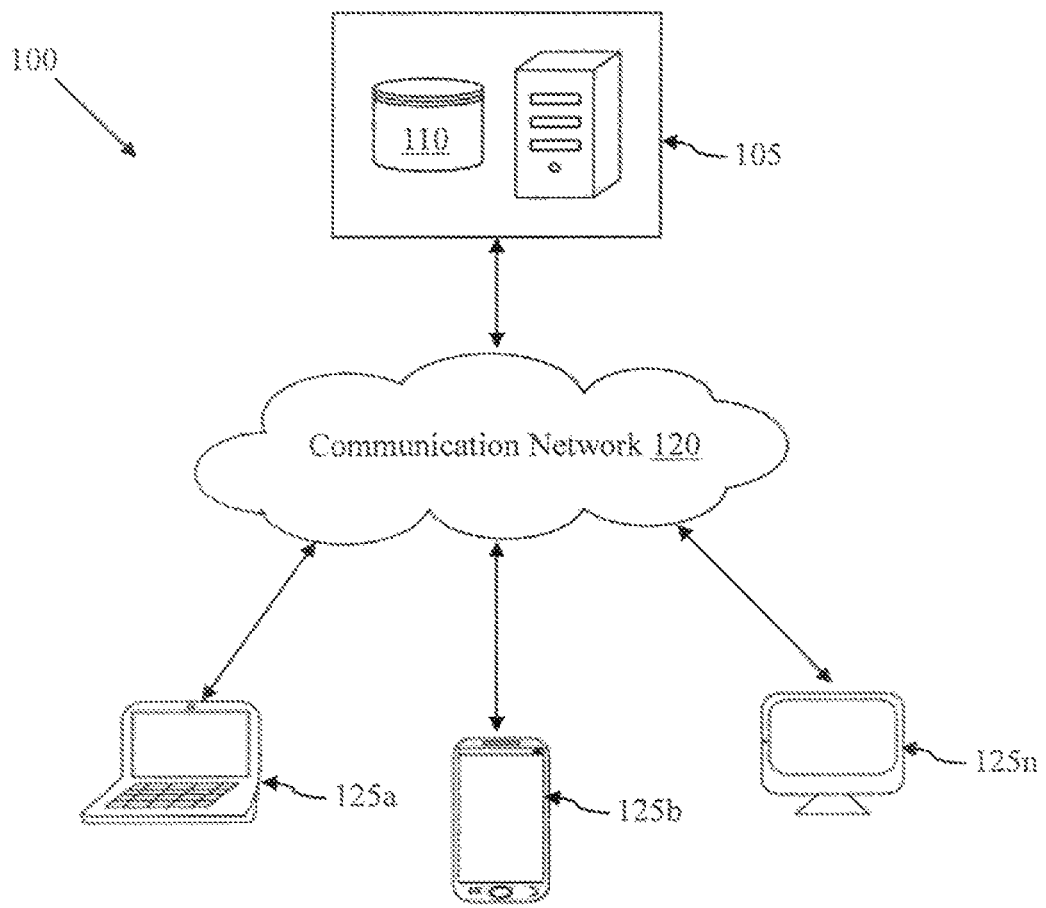
FIG. 1 illustrates a system for dynamically managing the one or more communication groups in a dedicated networking platform in accordance with an embodiment of the present disclosure.

FIG. 1 illustrates a system for dynamically managing the one or more communication groups in a dedicated networking platform in accordance with an embodiment of the present disclosure. As shown, the system 100 comprises a server 105, one or more processors 110 and a database 115, a communication network 120 and one or more user devices 125a to 125n, wherein the server 105 and the one or more user devices 125a to 125n are communicatively connected through the communication network 120.

Further, in accordance with the present disclosure, the user device 125a to 125n (hereafter referred as user device 125) may be a mobile, a computer, a tablet, or any other device operated by the one or more users for accessing the dedicated networking platform. The user device 125 may communicate with the server 105 through the communication network 120 in one or more ways such as wired, wireless connections or a combination thereof. It will be appreciated by those skilled in the art that the user device 125 may include one or more processors for processing data, one or more memory units for instructions and data storage and other known functional units enabling communication between the user device 125 and the server 105 for data exchange.

The communication network 120 may be a wireless network or a wired network or a combination thereof. Wireless network may include long range wireless radio, wireless personal area network (WPAN), wireless local area network (WLAN), mobile data communications such as 3G, 4G or any other similar technologies. The communication network 120 may be implemented as one of the different types of networks, such as intranet, local area network (LAN), wide area network (WAN), the internet, and the like. The communication network 120 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and alike. Further the communication network 120 may include a variety of network devices, including routers, bridges, servers, modems, computing devices, storage devices, and the like. In one implementation, the communication network 120 is the internet which enables communication between the user devices 125a to 125n and the sever 105.

The server 105 may include, for example, a computer server or a network of computers or a virtual server which provides functionalities or services for other programs or devices such as for the user device 125. In one implementation, the server 105 is a cloud server comprising one or more processors, associated processing modules, interfaces and storage devices communicatively interconnected to one another through one or more communication means for communicating information. The storage devices within the management server 105 may include volatile and non-volatile memory devices for storing information and instructions to be executed by the one or more processors and for storing temporary variables or other intermediate information during processing. In one embodiment of the present disclosure, server 105 comprises a database 110 that records one or more user profiles and profile related information and maintains a record one or more communication groups created by a group administrator. In other words, the server 105 hosts the dedicated networking platform in which the administrator may create one or more communication groups and define one or more objectives for each one of the one or more communication groups.

In some other implementations, one or more communication groups (one or more groups) of different categories may be created on a single platform. For example, a first administrator may create one or more communication groups for MBA students (for example MBA Students Group), a second administrator may create one or more communication groups for GATE entrance exam, a third administrator may create one or more communication groups for JAVA learners, etc.

The term dedicated networking platform described herein refers to a platform for connecting one or more users with other users, creating one or more communication groups of one or more categories comprising the one or more users, in general via a wireless or wired medium. By way of example, as described, the dedicated networking platform may be a platform for student community where students belonging to different institutions may connect with each other to share plurality of content. The dedicated networking platform of the current example may be accessed by the one or more users using the user devices 125a to 125n via a client application, a web application or any other means known in the art.

In respect to the above embodiment of the present disclosure, the system 100 provides a client application that may be installed on the user devices 125a-n. After installation, the user may register with the system 100 by providing necessary login credentials such as but not limited to, username, password and contact details, etc. Upon registration, a profile is created for the user in the database 115. In one embodiment of the present disclosure, the user may select one or more categories and may update the profile accordingly by providing details such as but not limited to user's education qualification, academic details, personal and job oriented skills, hobbies and interests, social activities, etc.

In one embodiment of the present disclosure, each of the one or more communication groups has one or more predefined objectives wherein the one or more predefined objectives may include but not limited to minimum requirements to join the one or more groups, a pre-defined threshold for joining the groups, final date for joining the groups, user's geographical areas, etc. In general, the one or more predefined objectives define the criteria for joining by the user or criteria for the system to add or recommend the users.

For example, a student (registered with the system/platform) may host one communication group for MBA aspirants; the objective of the group being to share study material and other trivial details among group members. The pre-determined threshold for this exemplary group may be defined by the dedicated networking platform. By way of example, one of the pre-determined thresholds is to add users who qualify a mock test for MBA aspirants. In yet another example, the pre-determined threshold is to add users to the MBA aspirants group having a CGPA of 7 or more. In the context of the preceding example, the system of the present disclosure may be configured to retrieve plurality user profiles matching the pre-defined objectives of the group and recommend the users to join the group. In some implementations, the information regarding user profile may be fetched from the local database 110 or from external sources; such as to obtain and verify the CGPA of user, the system may be configured to retrieve the information from an external source such as a database maintained by the University in which the user is enrolled. In another embodiment, the one or more users may send a request to join the group and the system evaluates the one or more users by comparing the one or more parameters associated with the user profiles with the one or more objectives associated with the communication group.

In another example, a user (hereafter referred to as administrator) may create and host one or more groups for JAVA learners, wherein the one or more groups belong to one category (JAVA learners) and may include a first "Entry Level" group, a second "Intermediary Level" group and a third "Expert Level" group. Further, the administrator may define one or more objectives for each one of the groups, wherein the one or more objectives for the "Entry Level" group may be basic programming skills of the users, a minimum (defined) score in an entry level test, etc. Similarly, the one or more objectives for the second "Intermediary Level" group may be one of a minimum score in the "Entry Level" test, completion of "Entry Level" activities or assignments, etc.

Once the administrator creates such communication groups, the server 105 retrieves the one or more user profiles information (that described one or more parameters) from the database 110, determines one or more pre-defined objectives associated with the one or more communication groups, evaluates the one or more users to determine relevance with the one or more pre-defined objectives associated with the one or more communication groups. Further, server 105 generates a relevancy score and recommends the one or more communication groups to the user based on the relevancy score. The one or more user selections for joining the one or more communication groups are received through client application and accordingly add the one or more users to the one or more communication groups.

In one embodiment of the present disclosure, the server 105 may evaluate a user by comparing the one or more parameters associated with the user profile with the one or more objectives associated with the one or more communication groups. Based on the result of comparison, the server 105 generates a relevancy score and user is recommended to join one or more groups based on the relevancy code.

Referring to JAVA learners' example, the system may compare the one or more objectives of the one or more groups (Entry Level, Intermediary Level and Expert Level) with the one or more parameters associated with one or more user profiles. Based on the result of comparison, each user has assigned a relevancy score and the one or more users are recommended to join one or more groups based on the relevancy score.

In another embodiment of the present disclosure, the administrator may evaluate (using the server 105) a user by generating and producing one or more tasks to the user. Initially, the user is selected based on simple profile and pre-defined objectives matching. Once the user is selected, the administrator may create one or more tasks (for example a test) based on at least one of the one or more parameters associated with the user profile and the one or more pre-defined objectives associated with the one or more communication groups. Then the user is prompted to complete the task and based on the performance a relevancy score is generated and the user is recommended to join one or more groups based on the relevancy score. In another embodiment of the present disclosure, the one or more tasks may include but not limited to one or more activities that needs to be performed by the users, one or more tests that needs to be completed by the user, etc. The tests may include at least one of a diagnostic test, formative test, benchmark test and summative test in one of a written test format, a verbal test or a quiz format. In general, the one or more tasks are generated and produced to the users to evaluate the users and hence the one or more tasks may be activities or tests or combination thereof.

Alternatively, the administrator may generate the one or more tasks for a group of users based on the one or more pre-defined objectives associated with the one or more communication groups. Such tasks are distributed to the group of users through their client applications and the system recommends the one or more users from the group of users to join the one or more groups based on their relevancy scores. It has to be noted that the tasks may be generated in any known methods such as quiz, online tests, offline tests, etc.

Referring to JAVA learners' example, the administrator may generate an entrance test for users who wish to learn JAVA and may define attributes such as minimum 50% score for "Entry Level", 75% score for "Intermediary Level" and 90% score for "Expert Level". Then the entrance test is produced to the users, wherein the entrance test may be made available for a pre-defined time period, for example for 4 hours, one day, one week, etc. Upon completion, the server 105 generates a relevancy score for each users based on their performance, wherein the relevancy score may be generated by comparing the answers provided by the users with the answers provided the administrator. In some implementations, the server 105 may be configured to evaluate the test and generate the relevancy score based on machine learning as known in the art. Thus generated relevancy score of each user is compared with the pre-defined attributes and the users are recommended to join the one or more groups accordingly. For example, a user "A" whose relevancy score is greater than 50% and less than 75% may be recommended to join "Entry Level Group", user "B" whose score is greater than "90%" may be recommended to join "Expert Level" group etc. The users of each communication group may communicate with other users for exchanging information, study materials, and other trivial details.

In one embodiment of the present disclosure, tasks may be generated for the group members/users. For example, one or more tasks may be generated and produced "Intermediary Level" group members to evaluate their performance and based on the relevancy score the one or more users may be recommended to join the next group, i.e., "Expert Group" or to continue in the existing group for specific time period. Further, the server 105 may remove one or more users from the selected communication group, after a pre-determined period of time upon determining that the user does not meet the pre-determined threshold anymore.

Figure 2:
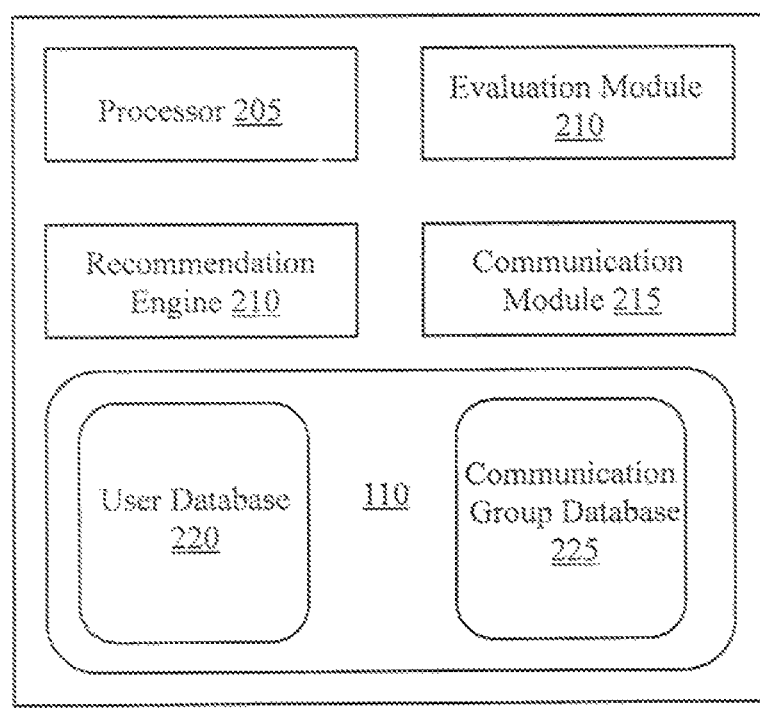
FIG. 2 is block diagram illustrating the server 105 in accordance with an embodiment of the present disclosure.

FIG. 2 is block diagram illustrating the server 105 in accordance with an embodiment of the present disclosure. As shown, the server 105 comprises a processor 205, an evaluation module 210, a recommendation engine 215, a communication module 215 and the database 110, wherein the database further comprises a user database 220 and a communication group database 225.

The user database 220 comprises user profiles of the one or more users registered to the platform, wherein user profile may include user details such as username, location, contact information, age, gender, etc. Further, the user profile may include one or more parameters such as but not limited to academic details, personal skills, educational records, work profile, hobbies and interests, social activities, and the like.

The communication group database 225 comprises details of one or more communication groups of different categories. For example, the communication group database 225 may include group name, associated administrator details, group members' details, one or more pre-defined objectives associated with the communication group, etc. On the other hand, the communication module 215 enables communication between the server 105 and the one or more user devices 125a to 125n for exchanging data.

In some implementations, the evaluation module 210 and the recommendation engine may be implemented on the processor 205. In one embodiment of the present disclosure, the evaluation module 210 is configuring for determining the one or more parameters associated with a user profile of a user subscribed to the dedicated networking platform, determining the one or more pre-defined objectives associated with the one or more communication groups, evaluating the user to determine relevance with the one or more pre-defined objectives associated with the one or more communication groups, wherein evaluating comprises generating a relevancy score and recommending the one or more communication groups to the user based on the relevancy score. As described, the evaluation comprise, comparing the one or more parameters associated with the user profile with the one or more objectives associated with the one or more communication groups and generating the relevancy score based upon result of comparison.

In another embodiment of the present disclosure, the evaluation comprises the step of generating one or more tasks based on at least one of the one or more parameters associated with the user profile and the one or more pre-defined objectives associated with the one or more communication groups, producing the one or more tasks to the user and generating the relevancy score based on performance of the user.

Figure 3:
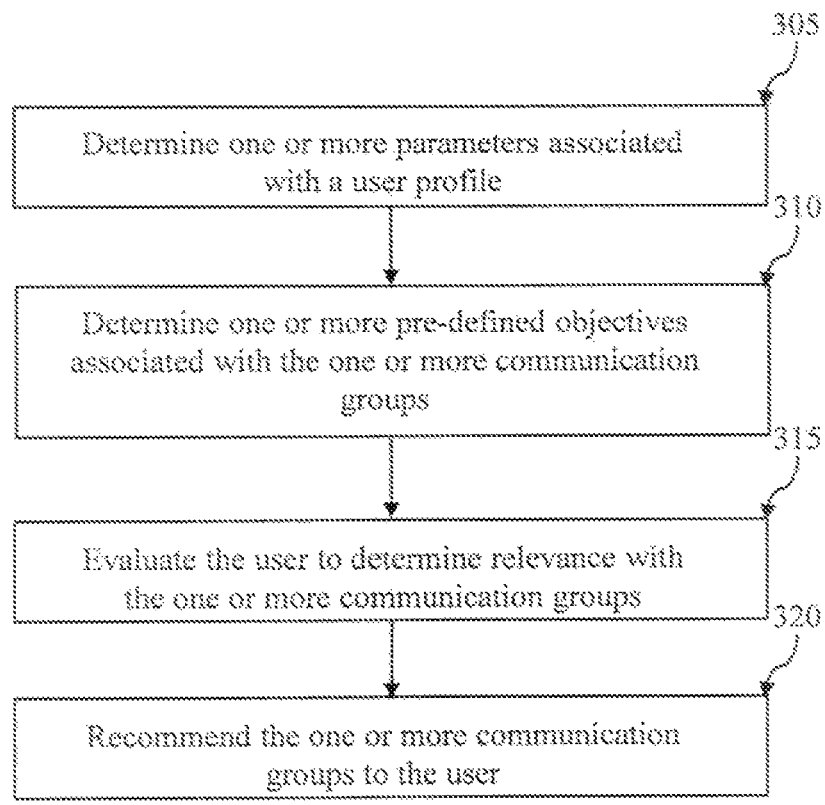
FIG. 3 is a flowchart illustrating a method of adding a user to one or more communication groups in accordance with an embodiment of the present disclosure.

FIG. 3 is a flowchart illustrating a method of adding a user to one or more communication groups in accordance with an embodiment of the present disclosure. At step 305 the server 105 determines one or more parameters associated with a user profile of a user subscribed to the dedicated networking platform, wherein the one or more parameters may include but not limited to a user location, academic details, personal skills, educational records, work profile, hobbies and interests, social activities, and the like.

At step 310, the server 105 determines one or more pre-defined objectives associated with the one or more communication groups, wherein the one or more pre-defined objectives are defined by at least a moderator/administrator of the one or more communication groups or the dedicated networking platform hosting the one or more communication groups. For example, upon receiving a request from the user for joining the one or more group, the server 105 determines one or more pre-defined objectives associated with the one or more communication groups.

At step 315, the server 105 evaluates the user to determine relevance with the one or more communication groups, wherein the evaluation is done to check the eligibility of the user to join the group. As described, the evaluation may be done by at least one of the two methods. In first method, the one or more parameters associated with the user profile is compared with the one or more objectives associated with the one or more communication groups and a relevancy score generated based upon result of comparison.

In the second method, one or more tasks are generated based on at least one of the one or more parameters associated with the user profile and the one or more pre-defined objectives associated with the one or more communication groups, the tasks are produced to the user and a relevancy score is generated based on performance of the user.

At step 320, the server 105 recommends the one or more communication groups to the user based on the relevancy score. The relevancy score is recorded in the user database for future reference and recommendation.

Upon adding the one or more users to the one or more communication groups, the server 105 monitors the actions took by one or more users in the communication groups. The actions include but are not limited to the content shared by the one or more users, performance of the one or more users in one or more tasks assigned to the communication group members and the like. Further, the server 105 evaluates the actions of the one or more users with respect to the pre-determined threshold for a pre-determined time. For example, if one of the tasks in a 'MBA aspirants study group' is to appear for mock tests once in a week, then the processing server 150 may evaluate the performance of the one or more users for at least one instance. If the one or more users do not meet the pre-determined threshold, then the server 105 may automatically remove the user from the communication group and recommends another communication group to the user. For example, in the context of the 'MBA aspirants study group', upon identifying that the user does not meet the pre-determined threshold, then the server 150 may recommend the user to join an exemplary 'revision group'.

Even though the system and methods are disclosed referring to students and educational purpose, the system and method may be implemented to enhance user skills in various domains such as sports, personality development, job related trainings and promotion, etc.

As is evident from the above disclosure, the system and methods of the present invention are thus advantageous in efficiently managing group based communications in a dedicated communication network. Another advantage of the system and method is to allow the users to continuously monitor their performance with peers in the areas of interest. Yet another advantage of the system and method is in bringing together users with common areas of interest to involve in group activities.

While specific language has been used to describe the invention, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

The invention claimed is:

1. A method for dynamically managing a plurality of communication groups in a dedicated networking platform, the method comprising:

determining one or more parameters associated with a user profile of a user subscribed to the dedicated networking platform;

determining one or more pre-defined objectives associated with each of the plurality of communication groups;

evaluating the user to determine relevance with the one or more pre-defined objectives associated with each of the plurality of communication groups, wherein evaluating comprises:

generating and producing one or more assessment tasks for execution by the user; wherein the one or more assessment tasks are generated based on at least one of the one or more parameters associated with the user profile and the one or more pre-defined objectives associated with each of the plurality of communication groups; and generating a relevancy score based on user performance in the assessment tasks; and recommending one or more communication groups from the plurality of communication groups to the user based on the relevancy score.

2. The method as claimed in claim 1, wherein the one or more parameters associated with the user profile comprises at least one of a user location, academic details, personal skills, educational records, work profile, hobbies and interests, social activities or combinations thereof.

3. The method as claimed in claim 1, wherein the one or more pre-defined objectives associated with each of the plurality of communication groups are defined by at least a moderator of the plurality of communication groups or the dedicated networking platform hosting the plurality of communication groups.

4. The method as claimed in claim 1, wherein evaluating the user comprises;

comparing the one or more parameters associated with the user profile with the one or more objectives associated with each of the plurality of communication groups; and generating the relevancy score based upon result of comparison.

5. The method as claimed in claim 1, wherein the one or more assessment tasks comprises at least one of one or more activities, a diagnostic test, formative test, benchmark test and summative test in one of a written test format, a verbal test or a quiz format.

6. A system for dynamically managing a plurality of communication groups in a dedicated networking platform, the system comprising a user device, a communication network and a server, wherein the server is configured for:

determining one or more parameters associated with a user profile of a user subscribed to the dedicated networking platform;

determining one or more pre-defined objectives associated with each of the plurality of communication groups;

evaluating the user to determine relevance with the one or more pre-defined objectives associated with each of the plurality of communication groups, wherein evaluating comprises: generating and producing one or more assessment tasks based on at least one of the one or more parameters associated with the user profile and the one or more pre-defined objectives associated with each of the plurality of communication groups; and generating a relevancy score based on performance of the user in the assessment tasks; and recommending one or more communication groups from the plurality of communication groups to the user based on the relevancy score.

\* \* \* \* \*